US008028297B2

(12) United States Patent
Yamamoto

(10) Patent No.: US 8,028,297 B2
(45) Date of Patent: Sep. 27, 2011

(54) NONSTOP PROGRAM SYSTEM AND A METHOD OF CONTINUOUSLY RUNNING PROGRAMS BY SWITCHING BETWEEN PROGRAM SIDES

(75) Inventor: Fumiaki Yamamoto, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 616 days.

(21) Appl. No.: 12/233,664

(22) Filed: Sep. 19, 2008

(65) Prior Publication Data

US 2009/0094619 A1 Apr. 9, 2009

(30) Foreign Application Priority Data

Oct. 5, 2007 (JP) ................................. 2007-261537

(51) Int. Cl.
*G06F 3/00* (2006.01)

(52) U.S. Cl. ....................................... 719/310

(58) Field of Classification Search .................... 719/310
See application file for complete search history.

(56) References Cited

U.S. PATENT DOCUMENTS

| 7,475,284 | B2 * | 1/2009 | Koike ............................. 714/12 |
| 7,559,006 | B2 * | 7/2009 | Chow et al. .................... 714/776 |
| 2007/0174658 | A1 * | 7/2007 | Takamoto et al. ............... 714/4 |

OTHER PUBLICATIONS

Ultra-low Standby-Currents for deep sub-micron VLSI CMOS Circuis: Smart Series Switch, May 28, 2000.*

* cited by examiner

*Primary Examiner* — Lechi Truong
(74) *Attorney, Agent, or Firm* — Volentine & Whitt, PLLC

(57) ABSTRACT

A nonstop program system includes program sides each including programs accomplishing the required function of the system and a dedicated variable area storing variables used for executing the program. Those programs are independent of each other and have the same contents. When the operational state of one program side is set to an ACT state, while using the one program side as the active side for executing the program in the one program side, the operational state of another program side is set to a HOT_SBY state, and a variable area of the other program side is synchronized with the variable area of the active side, thereby alternately and periodically switching the operational states of the program sides. When switching the active side, the operational state of the other program side is switched to the ACT state to cause the other program side as the active side to continuously execute the program.

2 Claims, 4 Drawing Sheets

NONSTOP PROGRAM SYSTEM AND A METHOD OF CONTINUOUSLY RUNNING PROGRAMS BY SWITCHING BETWEEN PROGRAM SIDES

BACKGROUND OF THE INVENTION

1. Field of the Invention

The present invention relates to a nonstop program system and a method of continuously running predetermined programs while defragmenting memory in such a system.

2. Description of the Background Art

Conventionally, nonstop program systems can run nonstop to execute programs. Japanese patent laid-open publication No. 2002-259142 discloses a manner of switching applications and controlling the switching, which can solve memory leak caused at the time of execution of the application program as a new process to take over the old process without interruption of the process.

In the manner disclosed, software for controlling program start sets, in a software manager, index information and information identifying the generation of software and totally manages the start control of a plurality of the application programs in such a fashion that the software periodically switches from an old or current program to new one in response to a notice from time monitoring software to thereby automatically compensate for memory leak which might have been involved in the old program without interrupting the service provided by the application programs.

In the conventional system, however, it is impossible to solve the problem of memory fragmentation caused by repeating memory hunt and memory free at the time of executing the program.

Generally, the program dynamically hunts a memory area when required for effectively storing data to thereby secure the memory area and releases, or frees, the memory area when becoming unnecessary, thereby effectively utilizing the memory. when the memory hunt and free are repeated, continuous memory areas may not be secured, i.e. intermittent areas may be used. When such intermittent memory areas are used for executing a program so as to cause memory leak, the available memory areas are positioned fragmentarily, thus sometimes making it difficult to continuously run the program.

The memory fragmentation can occur everywhere of the memory. Such fragmented memory areas are minor portions on the whole memory, indeed. However, they tend to cause the unavailable memory areas to increase. In this case, the areas unavailable for memory hunt decrease and the areas available for memory hunt become fragmentary. Thus, the conventional nonstop program systems bring bad influence, e.g. the system interruption or slowdown of processing.

SUMMARY OF THE INVENTION

It is an object of the present invention to provide a nonstop program system capable of using a memory without causing an unavailable memory area which would otherwise be caused by memory fragmentation and without lowering the processing speed, and a method of continuously running predetermined programs in such a system.

In accordance with the present invention, a nonstop program system for continuously running predetermined programs comprises: a plurality of program sides, each of which includes a program accomplishing the required function of the system and a variable area storing a variable for use in executing the program, the programs of the plurality of program subsystems being independent of each other and having the same content as each other; and a main controller for controlling an active side and an operational state of each program subsystem to run the program on the active side as an active program, the main controller controlling to set an operational state of one of the plurality of program subsystems to an active (ACT) state to cause the one program subsystem as the active side to execute the program in the one program subsystem, and to set the operational state of another of the plurality of program subsystems to a hot standby (HOT_SBY) state and to synchronize a variable area of the other program subsystem with a variable area of the active side, thereby alternately switching the operational states of the plurality of program subsystems in a periodical manner, the system switching, when switching the active side, the other operational state to the ACT state, and using the other program subsystem as the active side to continuously execute the program in the other program subsystem.

In accordance with an aspect of the invention, a method of continuously running predetermined programs in a system, wherein each of a plurality of program subsystems includes a program accomplishing the required function of the system and a dedicated variable area storing a variable for use in executing the program, the programs of the plurality of program subsystems being independent of each other and having the same content as each other, comprises the step of controlling an active side and an operational state of each of the plurality of program subsystems to run the program on the active side as an active program, the controlling step setting an operational state of one of the plurality of program subsystems to an ACT state to cause the one program subsystem as the active side to execute the program in the one program subsystem, and to set the operational state of another of the plurality of program subsystems to a HOT_SBY state and to synchronize a variable area of the other program subsystem with a variable area of the active side, thereby alternately switching the operational states of the of the plurality of program subsystems in a periodical manner, the controlling step switching, when switching the active side, the operational state to the ACT state, and using the other program subsystem as the active side to continuously execute the program in the other program subsystem.

According to the nonstop program system of the present invention, a plurality of program subsystems are included and any one of the program subsystems is provided as an active side for operating the system. Each program subsystem includes a program and a dedicated variable area. The respective programs are independent of each other and have the same content as each other. In the system, a main controller controls the active side and an operational state of each program subsystem, for instance, so as to set the operational state of one program subsystem to an ACT state, while using the one program subsystem as the active side for executing the program in the one program subsystem. Then, the main controller controls to set the operational state of another program subsystem to a HOT_SBY state and to synchronize a variable area of the other program subsystem with a variable area of the one program subsystem. The operational states of the program subsystems are alternately switched in a periodical manner, while the active side is switched. When the active side is switched, the operational state of the other program subsystem is set to the ACT state and the other program subsystem is used as the active side to continuously execute the program in the other program subsystem. Thus, in the system, it is possible to quickly and smoothly switch the active program subsystem without interruption of the process and to hold variable values in common, thereby effectively solving the problem of memory fragmentation.

Moreover, in the nonstop program system of the present invention, a cycle generating controller issues an interrupt in a predetermined cycle to control the switching of the active side. When the active side is shifted from one program subsystem to another, the operational state of the one program subsystem may be switched from the ACT state to the SBY state. Next, after a variable area of the one program subsystem is defragmented, or defragged, the operational state of the one program subsystem is switched to the HOT_SBY state and the variable area of the one program subsystem is made synchronous with the variable area of the switched active side. Thus, in the system, it is possible to defragment a memory during running the system, i.e. to arrange the fragmented memory areas without interruption of the process.

Accordingly, it is possible to solve one of memory problems by an idea of the present invention and to utilize the idea for accomplishing a reliable nonstop program system.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
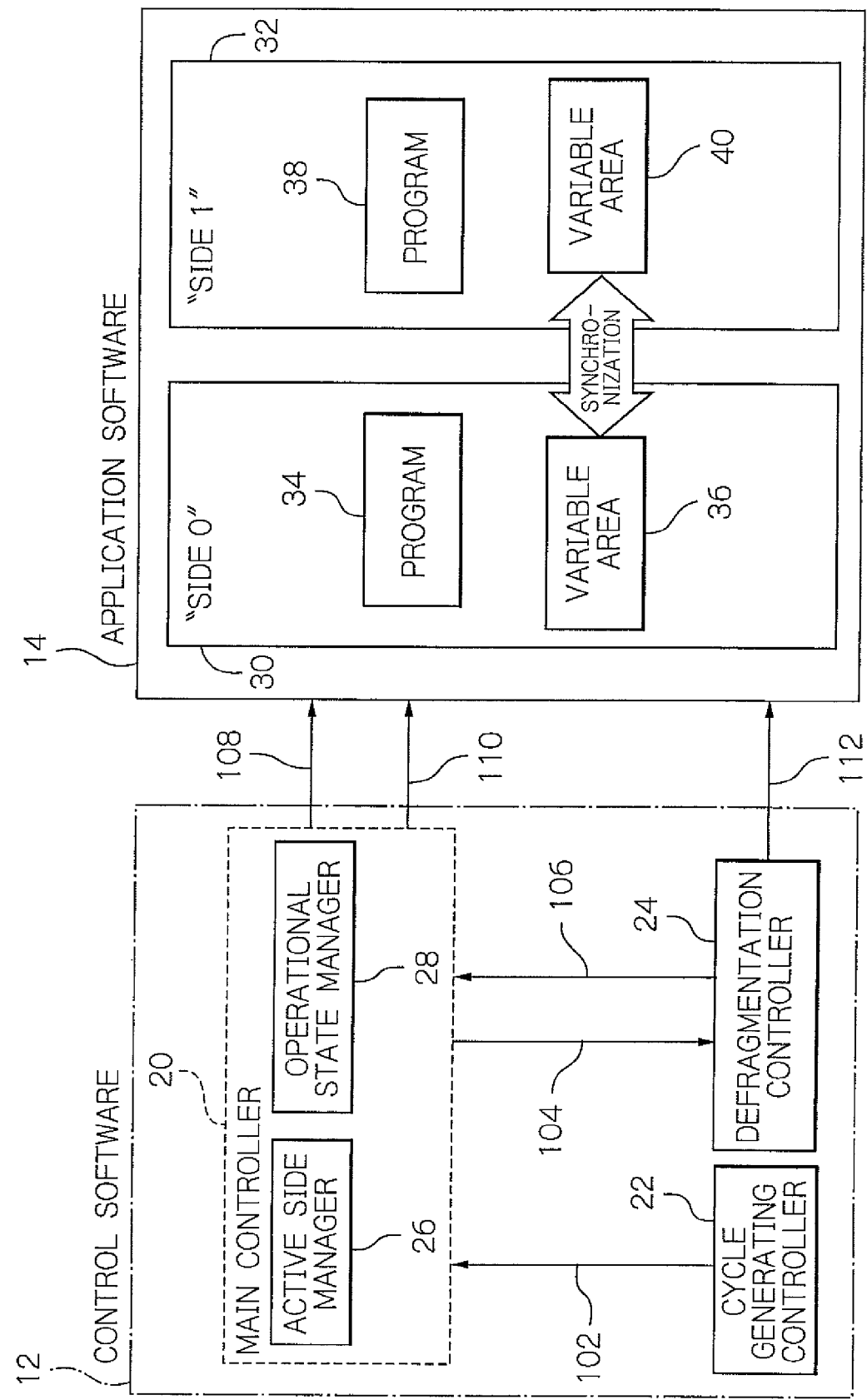
FIG. 1 is a schematic block diagram showing a preferred embodiment of a nonstop program system in accordance with the present invention.

With reference to the accompanying drawings, an illustrative embodiment of the nonstop program system according to the present invention will be described in more detail. As shown in FIG. 1, the nonstop program system of the illustrative embodiment, generally designated by a reference numeral 10, includes a control software 12 for managing the running operation of the system 10 and an application software 14 which runs a program for the purpose of providing a service of the system 10. The control software 12 serves to control the execution of the program of the application software 14 so as to solve the problem of the fragmentation of the memory used by the application software 14. Note that parts not directly relevant to understanding of the present invention will neither be described nor shown for avoiding redundancy.

The control software 12 includes a main controller 20 for controlling the entire system 10, and a cycle generating controller 22 for controlling switching to active one of program sides, or subsystems, on the active subsystem a program running. The control software 12 also includes a defragmentation controller 24 for controlling fragmentation of a variable area of an inactive or standby program side, or subsystem. The main controller 20 includes an active side manager 26 for managing the active program side, and an operational state manager 28 for managing the operational state of the program sides.

The application software 14 is provided with at least two program sides, or substances, 30 and 32 for running a predetermined program, which does not has to be interrupted in running. Both program sides 30 and 32 respectively include programs 34 and 38 and variable areas 36 and 40.

The system 10 serves to set any one of an active (ACT) state, a hot standby (HOT_SBY) state and a standby (SBY) state as the operational states of the respective programs 34 and 38 to the respective program sides 30 and 32. The ACT state indicates that the program of that program side to which its state is set is active or running. The HOT_SBY state indicates that both program sides 30 and 32 are made synchronous in terms of the content of a variable area of the program side to which its state is set active with a variable area of the other side, namely a mirroring operation. The SBY state indicates that the program of the program side to which its state is set is inactive or standby.

The main controller 20 is a general controller adapted to control the entire system 10. Particularly, in the illustrative embodiment, the controller 20 monitors the operational state of the active one of the respective program sides 30 and 32 in the application software 14. The controller 20 outputs to the application software 14 a memory synchronous instruction signal 108 for instructing the synchronization of the memory contents between the variable areas 36 and 40, and a state switching instruction signal 110 for instructing the switching of the active program side and the operational state of the respective program sides. Moreover, the controller 20 outputs a defragmentation control signal 104 to the defragmentation controller 24. In response to the defragmentation control signal 104, the defragmentation controller 24 performs the defragmentation 112 to the application software 14. For instance, the controller 24 is responsive to the defragmentation instruction signal 112 to defragment the variable area of the program side on the HOT_SBY state in the application software 14.

The active program side manager 26 of the main controller 20 saves information indicating which of the program sides 30 and 32 is used to run the program as the active program side. The operational state manager 28 saves information indicating the operational states of the program sides 30 and 32 in correspondence with the active program side managed by the active program side manager 26.

In the main controller 20 of the illustrative embodiment, the active program side manager 26 is responsive to an interrupt 102 output from the cycle generating controller 22 to confirm which program side is the active side. The controller 20 thus outputs the state switching instruction signal 110 according to a result form the confirmation to the program sides 30 and 32 in the application software 14. Specifically, the controller 20 instructs the program side on the ACT state to switch to the SBY state and the program side on the HOT_SBY state to switch to the ACT state.

In addition, the main controller 20 outputs, in response to a defragmentation completion signal 106 from the defragmentation controller 24, the state switching instruction signal 110 to the defragmented program side such that this program side is switched from the SBY state to the HOT_SBY state.

Furthermore, in the main controller 20, the operational state manager 28 confirms the operational state of the program in the respective program sides 30 and 32. As a result of the confirmation, if the program in one program side is in the HOT_SBY state, the main controller 20 outputs the memory synchronization instruction signal 108 to the application software 14 so as to make memory contents of the variable area of the one program side synchronously correspond with memory contents of the variable area of the other program side.

As a result of the confirmation, if the program in one program side is in the SBY state, the main controller 20 outputs the defragmentation control signal 104 to the defragmentation controller 24 so as to defragment or defrag a variable area in the one program side.

The cycle generating controller 22 issues the interrupt 102 in a predetermined cycle to the main controller 20 so as to make the main controller 20 switch either one of the program sides 30 and 32 to the active program side in response to the interrupt 102.

The defragmentation controller 24 defragments or defrags, in response to the defragmentation control signal 104 from the main controller 20, the variable area of the program side indicated by the signal 104 so as to solve the problem of memory fragmentation caused by memory hunt and free. When the defragmentation is finished, the defragmentation controller 24 outputs the defragmentation completion signal 106 to the main controller 20.

The application software 14 includes the memory area that is divided for the respective program sides, e.g. into subareas corresponding to the couple of program sides 30 and 32 in the illustrative embodiment. In what follows, the program sides 30 and 32 are sometimes referred to as "side 0" and "side 1", respectively. The application software 14 utilizes either one of the program sides 30 and 32 as the active side and runs the program in the active side as an active program.

The application software 14 of the illustrative embodiment switches the operational state of the program sides 30 and 32 in response to the state switching instruction signal 110 from the main controller 20 of the control software 12. For instance, the operational state of a program side on the ACT state is switched to the SBY state, and the operational state of the other program side on the HOT_SBY state is switched to the ACT state.

The application software 14 may switch the operational state of a program side on the SBY state to the HOT_SBY state in response to the state switching instruction signal 110 from the main controller 20 of the control software 12.

The programs 34 and 38 are equivalent to each other and designed to accomplish the required function of the present system 10.

The variable areas 36 and 40 are storage areas provided separately for storing variables and other values that are used for executing the program. In the illustrative embodiment, the variable area 36 is exclusively used by the program 34, and the variable area 40 is exclusively used by the program 38. In other words, the one program 34 cannot access the one variable area 40, and the other program 38 cannot access the other variable area 36.

When the application software 14 of the illustrative embodiment receives the memory synchronization instruction signal 108 from the main controller 20 of the control software 12, the application software 14 performs a mirroring operation so that the variable area of the program side on the HOT_SBY state is synchronized with the variable area of the other program side on the ACT state, thereby holding equivalent variables in both the variable areas.

Figure 2:
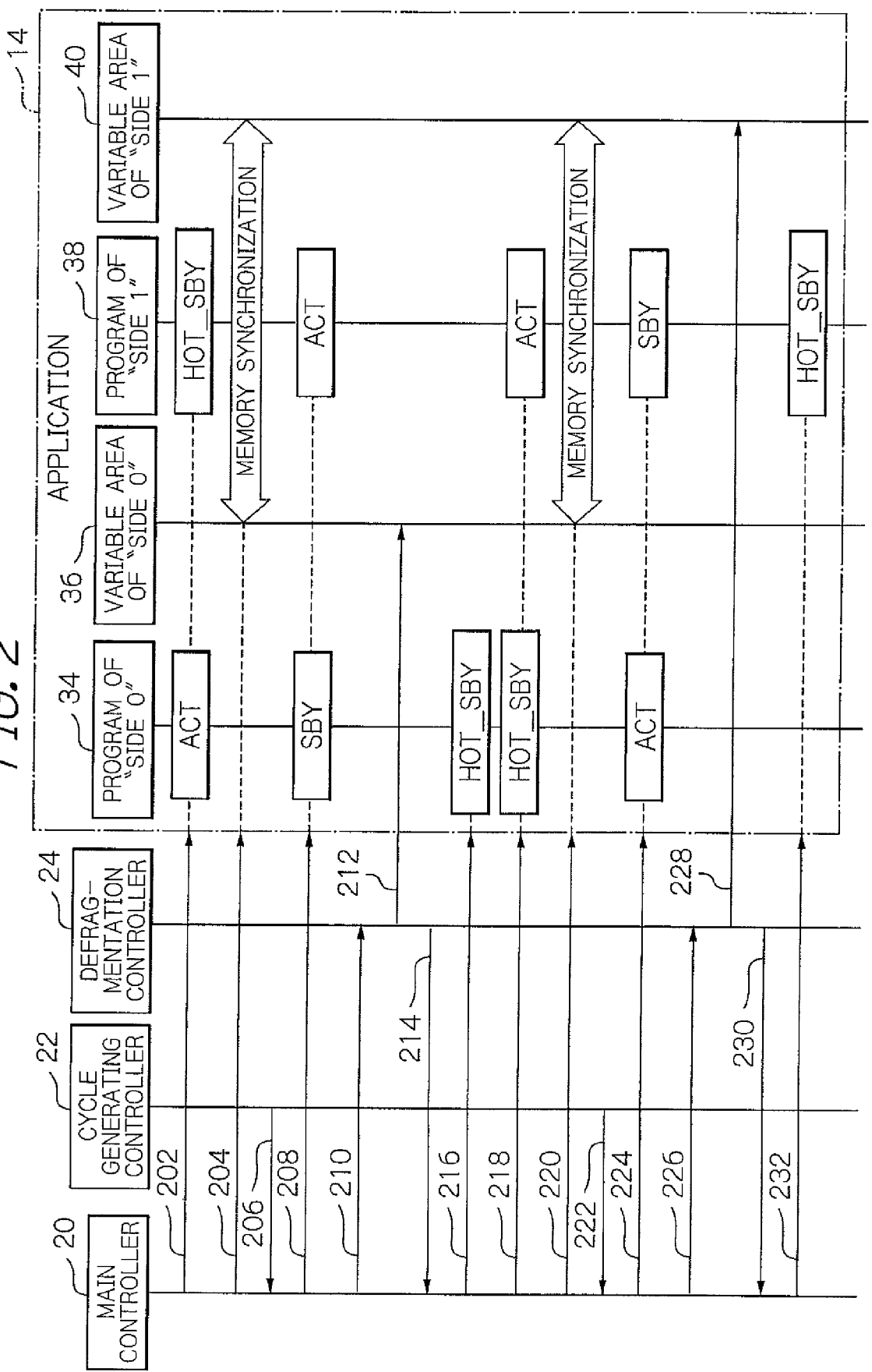
FIG. 2 is a sequence chart useful for understanding the operation procedure of the nonstop program system of the embodiment shown in FIG. 1.
Figure 3:
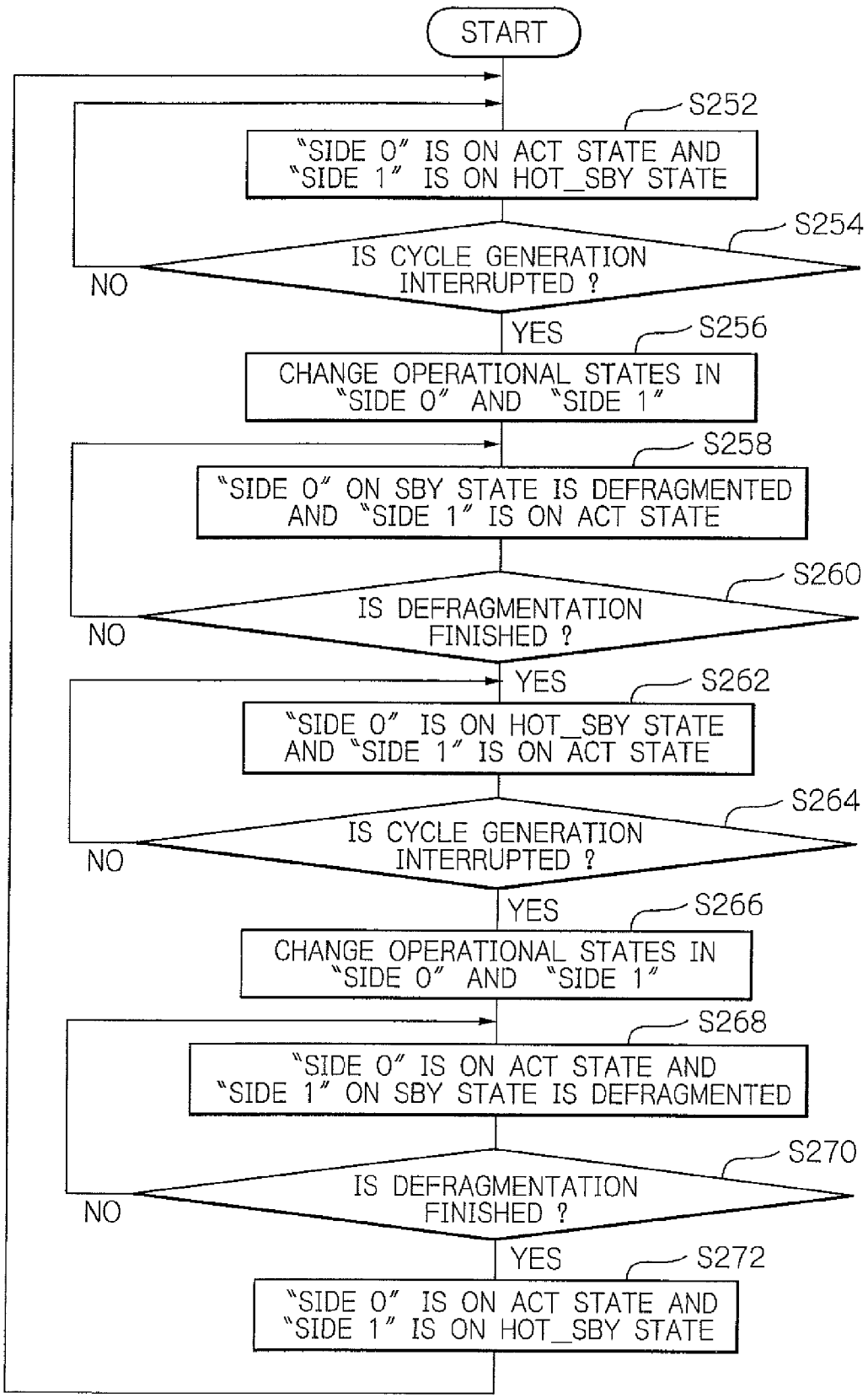
FIG. 3 is a flow chart useful for understanding the operation procedure of the nonstop program system of the embodiment shown in FIG. 1.
Figure 4:
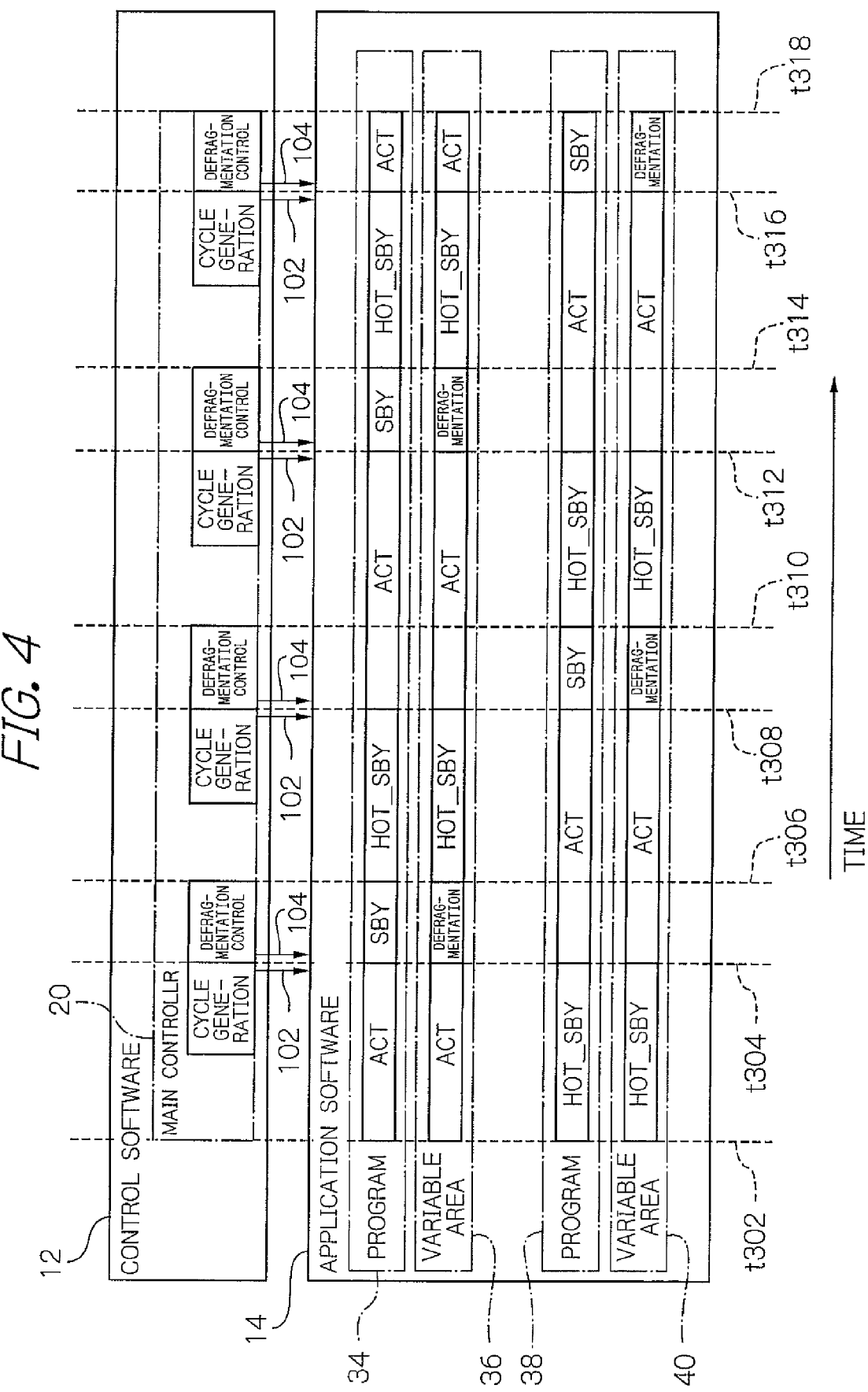
FIG. 4 schematically shows the operational state transition of the respective program subsystems in application software of the nonstop program system of the embodiment shown in FIG. 1.

Next, the operation of the nonstop program system 10 of the illustrative embodiment will be described with reference to the sequence chart shown in FIG. 2 and the flow chart shown in FIG. 3 as an example of defragmenting memory. In the system 10, the operational state of the respective program sides is shifted with time as shown in FIG. 4.

First, when starting the system 10, the main controller 20 sets one program side, for example, the "side 0" 30 to the ACT state, and the other program side, for example, the "side 1" 32 to the HOT_SBY state (S252).

The main controller 20 performs a program side monitoring process 202 for the application software 14 to confirm the operational state of the respective program sides 30 and 32 and the active program side and to store the confirmation resultant information to the active program side manager 26 and the operational state manager 28. In this case, as illustrated in FIG. 4, the controller 20 confirms that, at time point t302, the "side 0" 30 is on the ACT state (the program 34 and the variable area 36) and that the "side 1" 32 is on the HOT_SBY state (the program 38 and the variable area 40).

On the other hand, since the program side 32 is on the HOT_SBY state, the main controller 20 outputs the memory synchronization instruction signal 108 (204) to the application software 14 to synchronize the variable area 40 on the HOT_SBY state with the variable area 36 on the ACT state. The memory synchronization is continued until the interrupt 102 (206) is issued by the cycle generating controller 22.

Next, in step S254, it is determined whether or not the interrupt 102 is issued by the cycle generating controller 22. As a result, if the interrupt 102 is issued, the process proceeds to step S256, and is otherwise returned to step S252.

In the illustrative embodiment, the cycle generating controller 22 issues the interrupt 102 (206) after a predetermined period elapses (in a predetermined cycle) to the main controller 20 and the process proceeds to step S256.

In step S256, the main controller 20 outputs, in response to the interrupt 102, the state switching instruction signal 110 (208) to the application software 14 to switch the active program side and the operational state of the respective program sides 30 and 32. In the illustrative embodiment, the operational state of the "side 0" 30 on the ACT state is switched to the SBY state, and the other operational state of the "side 1" 32 on the HOT_SBY state is switched to the ACT state. The "side 1" 32 is then used as the active program side (t304).

Thus, according to the memory synchronization, the variable area 40 of the "side 1" 32 continuously has the memory contents equivalent to the variable area 36 of the "side 0" 30 since the side 32 was on the HOT_SBY state. Moreover, both the variable areas 40 and 42 also hold the equivalent memory contents when the state of the side 32 shifts to the ACT state. Therefore, the active program side can be quickly and smoothly switched.

Next, the process proceeds to step S258 in which the main controller 20 outputs the defragmentation control signal 104 (210) for the program side on the SBY state to the defragmentation controller 24, which performs the defragmentation process 112 (212) of the program side on the SBY state, i.e. the "side 0" 30, in response to the signal 104 (210) so as to solve the problem of the memory fragmentation in the variable area 36 of the "side 0" 30.

The main controller 20 then determines whether or not the defragmentation process 112 (212) by the defragmentation controller 24 is finished (S260). As a result, if finished, the process proceeds to step S262, and otherwise to step S258.

In the illustrative embodiment, when the defragmentation process 112 (212) is finished, the defragmentation controller 24 outputs the defragmentation completion signal 106 (214) to the main controller 20, and the process proceeds to step S262.

In step S262, the main controller 20 outputs the state switching instruction signal 110 (216) for the program side after the defragmentation 112, i.e. for the "side 0" 30, to the application software 14 so that the operational state of the "side 0" 30 is switched from the SBY state to the HOT_SBY state (t306).

The main controller 20 then performs the program side monitoring process 218 for the application software 14 as described above to confirm the active program side and the operational state of the respective program sides 30 and 32, and stores the confirmation resultant information to the active program side manager 26 and the operational state manager 28. In this case, the "side 0" 30 is on the HOT_SBY state and the "side 1" 32 is on the ACT state (t306).

Since the "side 0" 30 is on the HOT_SBY state, the main controller 20 outputs the memory synchronization instruction signal 108 (220) to the application software 14 to make the variable area 36 on the HOT_SBY state synchronous with the variable area 40 on the ACT state.

Next, the process proceeds to step S264 in which it is determined whether or not the interrupt 102 is issued by the cycle generating controller 22 in the same manner as in step S254. In the illustrative embodiment, the cycle generating controller 22 issues the interrupt 102 (222) to the main controller 20 after a predetermined period elapses (in a predetermined cycle) followed by proceeding to step S266.

In step S266, in response to the interrupt 102 (222), the main controller 20 outputs the state switching instruction signal 110 (224) to the application software 14 in the same manner as in step S256. Namely, the operational state of the "side 1" 32 on the ACT state is switched to the SBY state and the other operational state of the "side 0" 30 on the HOT_SBY state is switched to the ACT state, so that the "side 0" 30 is used as the active program side (t308).

Next, the process proceeds to step S268 in which the main controller 20 outputs the defragmentation control signal 104 (226) to the defragmentation controller 24, which performs the defragmentation process 112 (228) of the program side on the SBY state, i.e. the "side 1" 32, in response to the signal 104 (226) so as to solve the problem of the memory fragmentation in the variable area 40 of the "side 1" 32 in the same manner as in step S258.

The main controller 20 then determines in step S270 whether or not the defragmentation process 112 (270) by the defragmentation controller 24 is finished in the same manner as in step S260. When the defragmentation process 112 (228) is finished, the defragmentation controller 24 outputs the defragmentation completion signal 106 (230) to the main controller 20, and the process proceeds to step S272.

In step S272, the main controller 20 outputs the state switching instruction signal 110 (232) for the program side after the defragmentation 112, i.e. for the "side 1" 32, to the application software 14 in the same manner as in step S262 so that the operational state of the "side 0" 32 is switched from the SBY state to the HOT_SBY state (t310).

The process is then returned to step S252 and the above process is repeated so that the program sides 30 and 32 are alternately switched as the active program side to run the programs 34 and 38 respectively. The system 10 can therefore run the programs without interruption while effectively solving the problem of memory fragmentation in the variable area 36 or 40.

The nonstop program system in accordance with the present invention can be applied to autonomous systems, which are difficult in resetting the power supply or restarting the system, such as systems embedded in medical equipment, artificial satellites and unmanned rockets. Thus, the nonstop program system in accordance with the present invention can be applied to any systems requiring the nonstop programs, and effectively solve the problem of memory fragmentation otherwise caused by executing the programs.

Incidentally, the nonstop program system in accordance with the present invention can be implemented as an embedded system which is a special-purpose computer system designed to perform a dedicated function, often with a real-time operating system (OS). In this case, the control software 12, the application software 14 and the real-time OS may be stored in a computer readable medium such as an read-only memory (ROM) from which program codes are read out and executed to run an application by a processor of the embedded system. In addition to this, a random-access memory (RAM) is provided for providing a working memory in which the variable area 36 or 40 are assigned.

The term "program side" is used herein to represent a memory portion consisting of an area of the memory in which a program code for performing a desired function is loaded and an area of the memory in which the locations of variables, constants and the like are allocated.

The two program sides are loaded on separate physical memory areas. However, a physical memory area for loading the program code may be shared by the two program sides, for example, in the case where the real-time OS supports separate logical memory spaces in which the program codes of the program sides are located in the same logical addresses. In this case, while the memory amount can be saved, the two program sides serve to provide two independent program execution environments as seen from the application. At least the memory area for dynamic memory allocation may be provided as a separate physical memory area dedicated for each program side.

In accordance with the present invention, there is provided a method of continuously running predetermined programs in a system, wherein each of a plurality of program subsystems includes a program accomplishing a required function of the system and a dedicated variable area storing a variable for use in executing the program, the programs of the plurality of program subsystems being independent of each other and having a same content as each other, said method comprising the step of controlling an active side and an operational state of each of the plurality of program subsystems to run the program on the active side as an active program, said controlling step setting an operational state of one of the plurality of program subsystems to an active (ACT) state to cause the one program subsystem as the active side to execute the program in the one program subsystem, and to set the operational state of another of the plurality of program subsystems to a hot standby (HOT_SBY) state and to synchronize a variable area of the other program subsystem with a variable area of the active side, thereby alternately switching the operational states of the plurality of program subsystems in a periodical manner, said controlling step switching, when switching the active side, the operational state of the other program subsystem to the ACT state, and using the other program subsystem as the active side to continuously execute the program in the other program subsystem.

In the method stated above, an interrupt is issued in a predetermined cycle to switch the active side.

The method stated above switches, when switching the active side, the operational state of the one program subsystem on the ACT state to a standby (SBY) state, and defragments the variable area of the one program subsystem on the SBY state, and thereafter switches the operational state of the one program subsystem on the SBY state to the HOT_SBY state to synchronize the variable area of the one program subsystem with the variable area of the other program subsystem on the active side.

The entire disclosure of Japanese patent application No. 2007-261537 filed on Oct. 5, 2008, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A nonstop program system for continuously running predetermined programs, comprising:
   a plurality of program subsystems, each of which includes a program accomplishing a required function of said system and variable area storing variable for use in executing the program, the programs of the plurality of program subsystems being independent of each other and having a same content as each other; and
   a main controller for controlling an active side and an operational state of each program subsystem to run the program on the active side as an active program,
   said main controller controlling to set an operational state of one of said plurality of program subsystems to an active (ACT) state to cause said one program subsystem as the active side to execute the program in said one program subsystem, and to set the operational state of another of said plurality of program subsystems to a hot standby (HOT SBY) state and to synchronize a variable area of said other program subsystem with a variable area of the active side, thereby alternately switching the operational states of said plurality of program subsystems in a periodical manner,
   said system switching, when switching the active side, the operational state of said other program subsystem to the ACT state, and using said other program subsystem as the active side to continuously execute the program in said other program subsystem;
   wherein said system switches, when switching the active side, the operational state of said one program subsystem on the ACT state to a standby (SBY) state, and defragments the variable area of said one program subsystem on the SBY state, and thereafter switches the operational state of said one program subsystem on the SBY state to the HOT SBY state to synchronize the variable area of said one program subsystem with the variable area of said other program subsystem on the active side.

2. The system in accordance with claim 1, further comprising a cycle generating controller for issuing an interrupt in a predetermined cycle to control the switching of the active side.

* * * * *